United States Patent [19]

Burrows

[11] Patent Number: 5,059,942
[45] Date of Patent: Oct. 22, 1991

[54] BIT MASKING COMPARE CIRCUIT
[75] Inventor: James L. Burrows, Merrimack, N.H.
[73] Assignee: Lockheed Sanders, Inc., Nashua, N.H.
[21] Appl. No.: 460,649
[22] Filed: Jan. 3, 1990
[51] Int. Cl.5 .............................................. G06F 7/02
[52] U.S. Cl. ............................................... 340/146.2
[58] Field of Search ................... 340/146.2; 364/746.2, 364/728.03, 769, 200 MS File, 900 MS File

[56] References Cited
U.S. PATENT DOCUMENTS 3,922,538 11/1975 Cochran et al. .................... 364/900
4,914,614 4/1990 Yamakawa ......................... 364/746.2

Primary Examiner—Gary V. Harkcom
Assistant Examiner—Long T. Nguyen
Attorney, Agent, or Firm—David W. Gomes

[57] ABSTRACT

A masked compare circuit for comparing a first N-bit dataword to a second N-bit dataword, the circuit including a decoder for receiving an M-bit mask code and generating an output signal identifying a bit position, K, derived from the M-bit mask code, M and K being positive integers; and a comparator module responsive to the decoder output signal for comparing the N−K+1 most significant bits of the first dataword to corresponding bits of the second dataword, the comparator module generating an output signal having a first value when all of the compared bits are the same and having a second value when any of the compared bits are different.

4 Claims, 3 Drawing Sheets

BIT MASKING COMPARE CIRCUIT

BACKGROUND OF THE INVENTION

The invention relates to a circuit and method for masking bits.

In some digital operations involving the comparison of two operands, it is desirable to exclude or "mask" some bits of the operands from the operation so that their unmasked binary values have no effect on the output of the operation. To accomplish this, TRIT (TeRniary digIT) logic, also referred to as 3-value logic, is often used. TRIT logic can store one of three states, namely, ZERO (0), ONE (1), and DON'T CARE (X). Thus, for example, when a bit of a dataword is compared to the stored state, the TRIT logic outputs a ONE, indicating a match, if the stored state is identical to the dataword bit or if the stored state is a DON'T CARE state. Otherwise, the TRIT logic outputs a ZERO, indicating no match. Using TRIT logic, however, generally doubles the word width for a given data transfer rate or halves the data transfer rate for a given word width. This is because two bits are required per TRIT logic to express the three different states.

SUMMARY OF THE INVENTION

In general, in one aspect, the invention is a masked compare circuit for comparing a first N-bit dataword to a second N-bit dataword. The circuit includes a decoder for receiving an M-bit mask code and generating an output signal identifying a bit position, K, derived from the M-bit mask code, and a comparator module responsive to the decoder output signal for comparing the $N-K+1$ most significant bits of the first dataword to corresponding bits of the second dataword, the comparator module generating an output signal having a first value when all of the compared bits are the same and having a second value when any of the compared bits are different.

Preferred embodiments include the following features. The decoder is a M-line to $2_M$-line decoder, the M input lines for receiving the M-bit mask code and the $2_M$ output lines for outputting the decoder output signal and wherein the decoder activates the particular output line identified by the mask code. The number M is no larger than INT[log$_2$N], where INT[x] signifies the smallest integer that is no less than x. The number $K+1$ is equal to the decimal equivalent of the M-bit mask code. The comparator module includes an array of N comparators, each comparator of the comparator array for comparing a different bit of the first dataword to a corresponding bit of the second dataword, the comparator array generating an N-bit match signal which identifies all bit positions of the first and second datawords that match; an array of gates responsive to the decoder output signal for generating a masked match signal by setting the first K bits of the match signal to indicate a match; and an N-input AND gate for receiving the masked match signal and producing the comparator module output signal therefrom.

Also in preferred embodiments the comparator module includes an array of gates responsive to the decoder output signal for converting the first dataword into a 3-state representation having n elements, $(c_{N-1}, c_{N-2}, \ldots, c_0)$, where each $c_i$ for $K \geq i \geq (N-1)$ is derived from a corresponding bit of the first dataword and each $c_l$ for $0 \geq i \geq (K-1)$ is equal to a DON'T CARE state, and a logic array comprising N 3-value logic cells, each 3-value logic cell for storing a corresponding bit of the second dataword and for receiving a corresponding element of the 3-state representation, the logic array generating the comparator module output signal.

One advantage of the invention is its ability to represent mask information with fewer bits than the number of bits in the dataword that is to be masked. Thus, in comparison to systems which require a mask bit for each of the bits in the dataword, larger word widths can be employed for a given data transfer rate and larger data transfer rates can be employed for a given word width.

DESCRIPTION OF THE PREFERRED EMBODIMENT

STRUCTURE AND OPERATION

Figure 1:
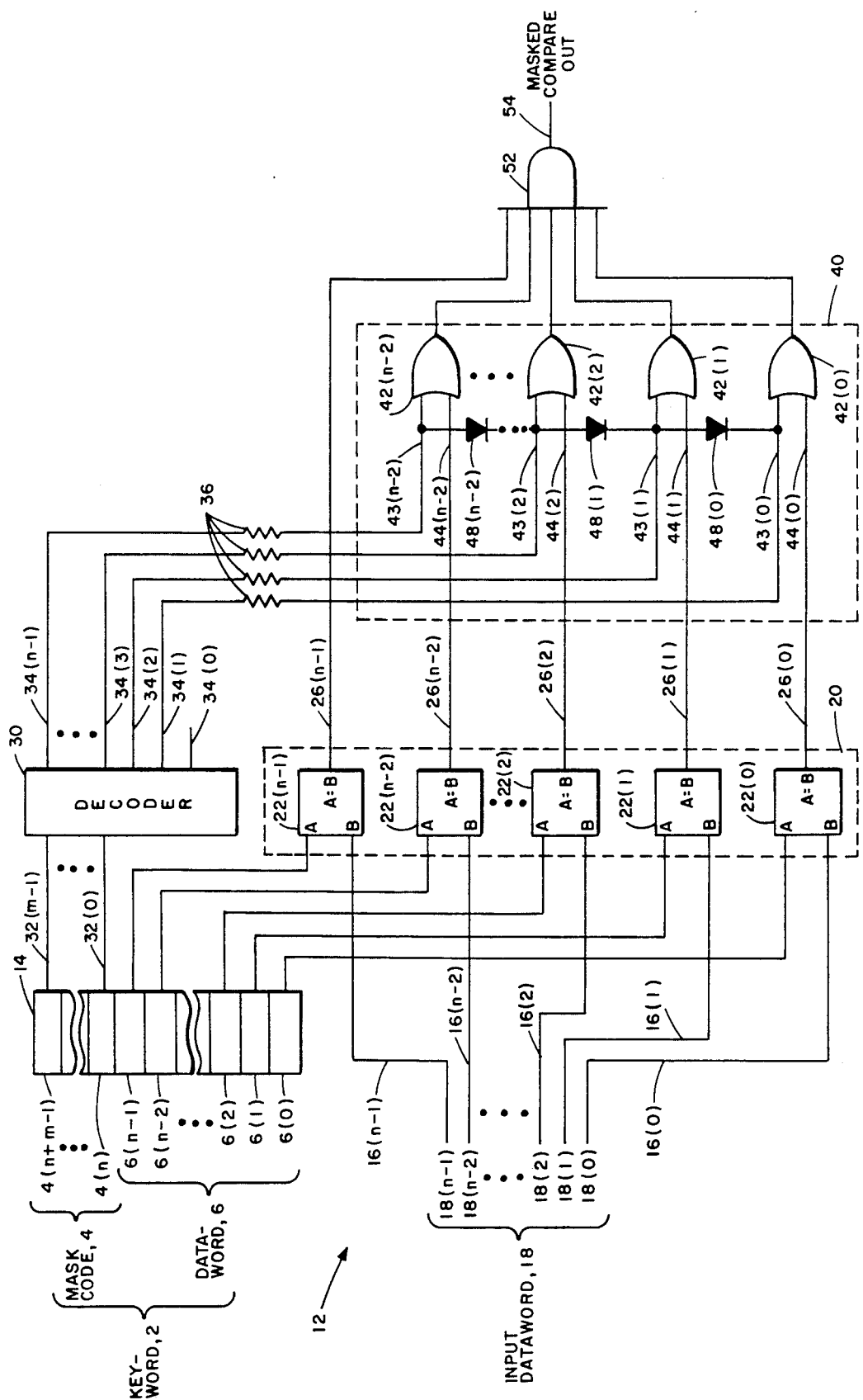
FIG. 1 is a block diagram of a masked compare circuit.

FIG. 1 illustrates a masked compare circuit 12 which handles mask-coded data in the form of an n+m bit keyword 2 in which the n least significant bits, namely, bits 6(0) through 6(n−1), represent dataword 6 and the m most significant bits, namely, bits 4(n) through 4(n+m−1), represent mask code 4. In circuit 12, a memory element 14 stores keyword 2 and input lines 16(0) through 16(n−1) (generally referred to as input lines 16) receive an n-bit input dataword 18 that is to be compared to the dataword portion of keyword 2 in a masked compare operation. The bits of input dataword 18 are designated as bits 18(0) through 18(n−1). Circuit 12 also includes a comparator array 20 for comparing bits of dataword 6 to corresponding bits of input dataword 18 and generating an n-bit match signal 26(0) through 26(n−1) (generally referred to as match signal 26) indicating which bit positions contain matches; it includes a decoder 30 for converting mask code 4 to a mask signal that identifies the number of contiguous least significant bits of match signal 26 that are to be masked; and it includes an array 40 of gates for masking the appropriate bits of match signal 26 in response to decoder 30.

Comparator array 20 includes a set of comparators 22(0) through 22(n−1) (generally referred to as comparators 22), one comparator for each of the n bit positions of dataword 6 and input dataword 18. Memory data lines 15(0) through 15(n−1) (generally referred to as data lines 15) connect comparators 22 to memory element 14. Each of comparators 22 has an A input, a B input and an output line 6(i), where i is an index identifying the comparator. The A input of each of comparators 22 receives a different bit of keyword 2 over a corresponding one of memory data lines 15 and the B input of each of comparators 22 receives a different bit of input dataword 18 over a corresponding one of input lines 16. Each of comparators 22 then compares the received bits of input dataword 18 and of keyword 2 and asserts a ONE (or equivalently a high voltage level) on its output line if the compared bits match or a ZERO (or equivalently a low voltage) if the compared bits do not match. Thus, for example, comparator 22(0) compares bit 18(0) of input dataword 18 to bit 6(0) of keyword 2; comparator 22(1) compares bit 18(1) of input dataword 18 to bit 6(1) of keyword 2; etc. If one bit mismatches, the entire match line will be pulled low.

Decoder 30 has m input lines 32(0) through 32(m−1) for receiving the bits of mask code 4 and it has n mask lines 34(0) through 34(n−1) (generally referred to as mask lines 34). Decoder 30 is a conventional m-line to $2^m$-line decoder which activates the output line 34(i) that corresponds to the binary-encoded value (i) of mask code 4. Thus, for example, if mask code 4 is binary 10, then decoder 30 activates mask line 34(2) by asserting a high on that line while holding all of its other output lines low (i.e., inactivated). And, if mask code 4 is binary 11, decoder 30 only activates mask line 34(3).

Array of gates 40 includes a set of OR-gates 42(0) through 42(n−2) (generally referred to as OR-gates 42), one OR-gate for each of the n−1 least significant bits of match signal 26. Each of the OR-gates 42 has two input terminals, identified in FIG. I as 43(i) and 44(i), where i is equal to the index of the corresponding one of OR-gates 42. A serially connected array of diodes 48(0) through 48(n−2) (generally referred to as diodes 48) interconnects input terminals 43(0) through 43(n−2). In particular, diode 48(0) interconnects input terminals 43(0) and 43(1); diode 48(1) interconnects input terminals 43(1) and 43(2); etc. The polarity of diodes 48 are arranged so that asserting a ONE on input terminal 43(n−2) of OR-gate 42(n−2) also results in asserting ONEs on the input terminals of all lower OR-gates, i.e. input terminals 43(0) through 43(n−3). Each of decoder output lines 34 is connected through a resistor 36 to a corresponding one of input terminals 43(0) through 43(n−2). Each of the other input terminals of OR-gates 42(0) through 42(n−2), i.e., input terminals 44(0) through 44(n−2), receives a corresponding bit of match signal 26. Finally, match signal 26(n−1) and the output signals of OR-gates 42(0) through 42(n−2) drive the inputs of an n-input AND-gate 52.

Circuit 12 operates as follows. Comparator array 20 generates a match signal 26 indicating which bits of input dataword 18 match the corresponding bits of dataword 6 and array of gates 40 then determines how many of the n−1 least significant bits of match signal 26 are ignored by AND-gate 52. In particular, mask code 4, which specifies the length of the mask that is applied to match signal 26, causes decoder 30 to activate the corresponding one of its output lines 34. The activated one of output lines 34 then causes the corresponding one of OR-gates 42 to be energized thereby masking its output signal from the corresponding bit of match signal 26. If the activated one of output lines 34 is higher than output line 34(1), then diodes 42 cause all OR-gates 42 below that level to also be energized. Thus, for example, an activated output line 34(3) energizes OR-gate 42(2) and diodes 42 cause OR-gates 42(1) and 42(0) to also be energized. With the first three least significant bits of match signal 26 masked in this way, the output of AND-gate 52 can no longer be influenced by these bits. That is, circuit 12 treats the first three bits of keyword 2 and of input dataword 18 as being matches. In that case, circuit 12 generates a masked compare output signal 54 indicating a match if only the unmasked higher order bits of dataword 6 match the corresponding bits of input dataword 18.

As should be readily apparent, to be capable of representing a mask length that masks all but the most significant bit (MSB) of n-bit dataword 6, m must satisfy the following condition:

$$m \geq INT[\log_2 n],$$

where INT[x] signifies the smallest integer that is no less than x. For example, if n equals 10, then m must be no less than 4 to be able to mask the nine least significant bits of the 10-bit dataword. In comparison to conventional methods of masking in which a mask bit is used for each data bit of dataword 6, this approach requires significantly fewer bits.

Other Embodiments

Figure 2:
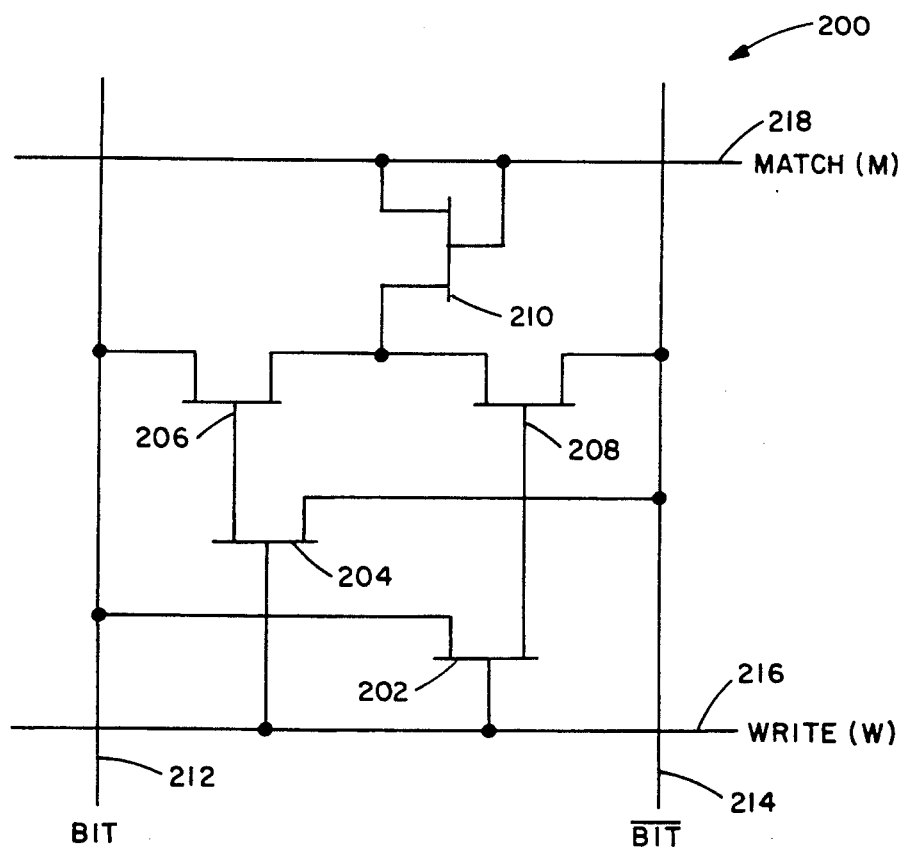
FIG. 2 is a schematic of a 3-state memory cell.

Another embodiment employs a 3-state memory cell such as CAM (Content Addressable Memory) cell 200 illustrated in FIG. 2. CAM cell 200, which is generally used with an array of other similar cells, stores one bit of a larger stored dataword, or CAMword. CAM cell 200 includes five pass transistors 202, 204, 206, 208, and 210, a BIT line 212 and a $\overline{BIT}$ line 214 for receiving data, a WRITE line 216 for setting the mode of cell 200 and a precharged MATCH line 218 for indicating the results of a compare operation. The gate capacitances of pass transistors 206 and 208 provide the storage for cell 200 and pass transistor 210, which is connected as a diode, serves to isolate cell 200 from the other CAM cells storing the other bits of the stored dataword, i.e., the CAMword.

CAM cell 200 can store one of three states, namely a ZERO state, a ONE state and a DON'T CARE state. The stored ZERO state is defined as a high voltage charge stored in the gate capacitance of pass transistor 208, causing pass transistor 208 to be in a conducting state, and a low voltage charge stored in the gate capacitance of pass transistor 206, causing pass transistor 206 to be in a non-conducting state. In contrast, the stored ONE state is defined as a low voltage charge stored in the gate capacitance of pass transistor 208, causing pass transistor 208 to be in a non-conducting state, and a high voltage charge stored in the gate capacitance of pass transistor 206, causing pass transistor 206 to be in a conducting state. Finally, the stored DON'T CARE state is defined as low voltage charges stored in the gate capacitances of both pass transistors 206 and 208, causing them to both be in non-conducting states.

Similarly, the data on BIT line 212 and a $\overline{BIT}$ line 214 has one of three allowable states, namely, a ZERO state, a ONE state, and a DON'T CARE state. In the ZERO state, BIT line 212 and a BIT line 214 are high and low, respectively. In the ONE state, BIT line 212 and a $\overline{BIT}$ line 214 are low and high, respectively. And in the DON'T CARE state, BIT line 212 and a $\overline{BIT}$ line 214 are both high.

CAM cell 200 operates as follows. When WRITE line 216 is energized (i.e., when a high is asserted on line 216), cell 200 is in a WRITE mode; and when WRITE line 216 is deenergized (i.e., when a low is asserted on line 216), cell 200 is in a MATCH mode. In the WRITE mode, pass transistors 202 and 204 are turned on thereby allowing data on BIT line 212 to be written into cell 200 where it is stored in the gate capacitance of pass transistor 208 and allowing data on $\overline{BIT}$ line 214 to be written into cell 200 where it is stored in the gate capacitance of pass transistor 206.

In the MATCH mode, data appearing on BIT line 212 and on $\overline{BIT}$ line 214 is compared to the stored state of CAM cell 200 and the output signal on MATCH line 218 indicates whether there is a match. If there is a match, MATCH line 218 remains high; whereas, if a there is not a match, MATCH line 218 is pulled low. For example, assuming that the stored state is ONE (i.e., pass transistor 206 is in a conducting state and pass transistor 208 is in a non-conducting state), then MATCH line 218 is pulled low only if a low appears on BIT line 212. This only happens when the data on BIT line 212 and $\overline{\text{BIT}}$ line 214 represents a ZERO 30 state. On the other hand, when cell 200 is storing a DON'T CARE state (i.e., both pass transistors 206 and 208 in non-conducting states), then MATCH line 218 is electrically isolated from both BIT line 212 and $\overline{\text{BIT}}$ line 214 and neither line can cause MATCH line 218 to go low. Finally, if the data on BIT line 212 and $\overline{\text{BIT}}$ line 214 represents a DON'T CARE state (i.e., both lines 212 and 214 are high), then neither line 214 or line 212 can cause MATCH line 218 to go low regardless of the stored state.

Figure 3:
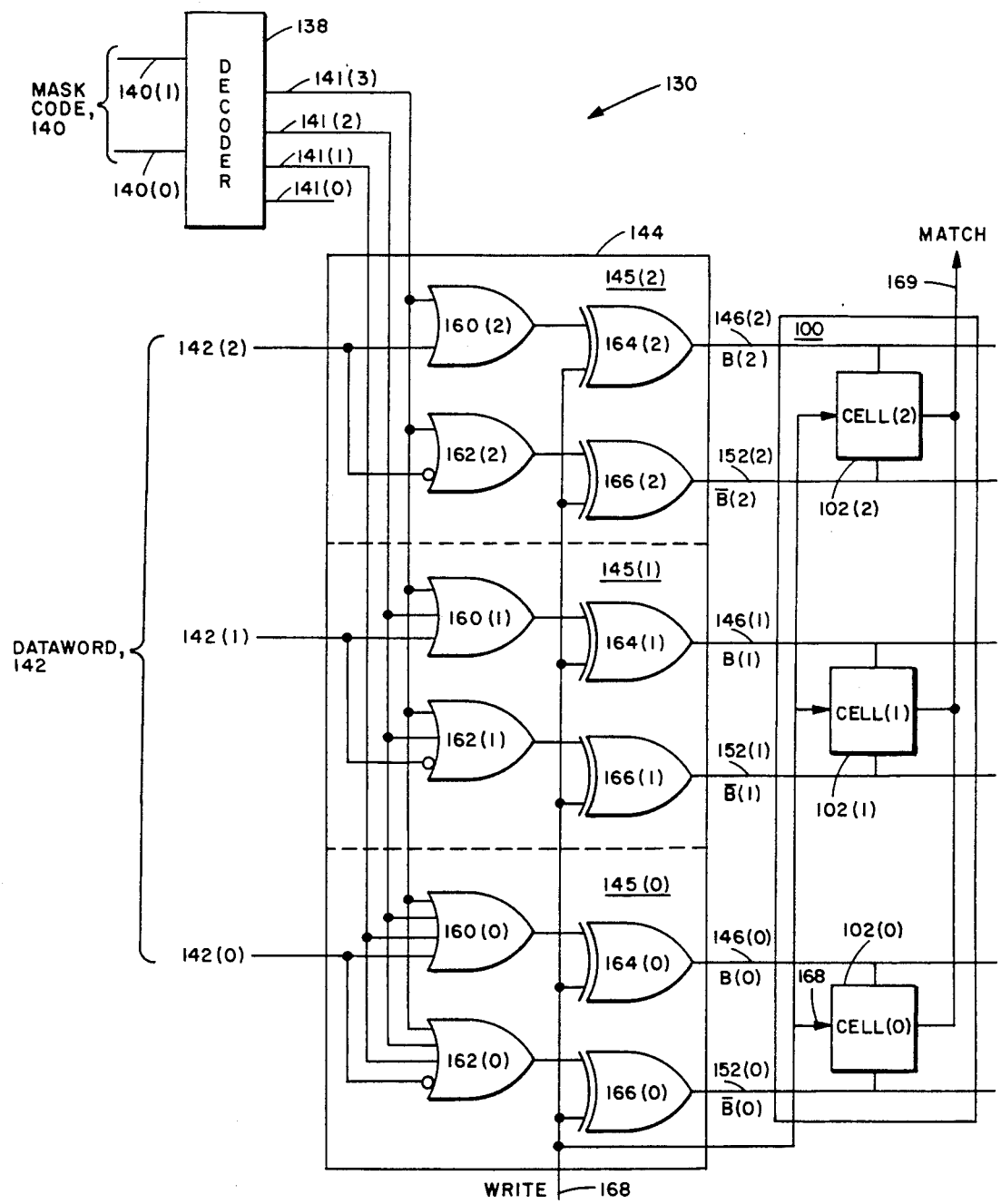
FIG. 3 is a block diagram of a masked compare circuit using the memory cell of FIG. 2.

A masked compare circuit 130 that employs a memory 100 built from the just described CAM cells is illustrated in FIG. 3. Memory 100 includes three CAM cells 102(0), 102(1) and 102(2) (generally referred to as CAM cells 102) for storing a CAMword. In circuit 130, a decoder 138 receives a 2-bit mask code 140 (having bits 140(0) and 140(1)) that specifies the length of the mask to be applied to a dataword 142 having bits 142(0), 142(1) and 142(2). Decoder 138, which has mask lines 141(0), 141(1), 141(2), and 141(3) (generally referred to as mask lines 141), operates as described for decoder 30 in FIG. 2. That is, decoder 138 activates the mask line 141(i) which corresponds to binary-encoded value i of mask code 140 while keeping its other mask lines inactive. The signals on mask lines 141(1), 141(2), and 141(3) control an array of gates 144 that generates a masked dataword having the proper format for CAM cells 102 from dataword 142.

Also in circuit 130, a WRITE line 169 supplies a signal to CAM cells 102 and to array of gates 144 that selects one of two modes, namely, a WRITE mode or a MATCH mode. Another line, designated MATCH line 169, carries an output signal indicating whether the masked dataword derived from dataword 142 matches the stored CAMword. A high on MATCH line 169 indicates a match and a low indicates no match.

Array of gates 144 includes three subarrays 145(0), 145(1) and 145(2) (generally referred to as subarrays 145), each one for handling a different bit of dataword 142. Each of subarrays 145(0), 145(1) and 145(2) has a pair of bitlines, namely, 146(i) and 152(i), where i equals the index of the corresponding subarray. Subarray 145(0) receives dataword bit 142(0) and generates a pair of bits B(0) and $\overline{\text{B}}$(0) which are coupled to bitlines 146(0) and 152(0), respectively. Subarray 145(1) receives dataword bit 142(1) and generates a pair of bits B(1) and $\overline{\text{B}}$(1) which are coupled to bitlines 146(1) and 152(1), respectively. And, subarray 145(2) receives dataword bit 142(2) and generates a pair of bits B(2) and $\overline{\text{B}}$(2) which are coupled to bitlines 146(2) and 152(2), respectively. (Bitlines 145(0), 145(1) and 145(2) are generally referred to as bitlines 145 and bitlines 152(0), 152(1) and 152(2) are generally referred to as bitlines 152.) Each of CAM cells 102 is connected across a corresponding pair of lines 146 and 154 so that it receives the appropriate bit pair generated by a corresponding one subarrays 145.

Subarray 145(0) includes an OR-gate 160(0) having four non-inverting inputs and an OR-gate 162(0) having three non-inverting inputs and one inverting input. Dataword bit 142(0) passes to one of the non-inverting inputs of OR-gate 160(0) and to the inverting input of OR-gate 162(0). The remaining three non-inverting inputs of OR-gate 160(0) and of OR-gate 162(0) are each driven by a corresponding one of the mask lines 141(1), 141(2) and 141(3) of decoder 138. Activation of any mask line 141(i) corresponding to a bit position that is equal to or higher than the bit position of dataword bit 142(0) energizes OR-gates 160(0) and 162(0) and thereby masks dataword bit 142(0).

Finally, an XOR-gate 164(0) that is controlled by a signal on WRITE line 168 generates B(0) from the output of OR-gate 160(0). And another XOR-gate 166(0) that is also controlled by the signal on WRITE line 168 generates $\overline{\text{B}}$(0) from the output of OR-gate 162(0).

In the WRITE mode (i.e., WRITE line 168 set high), subarray 145(0) operates as follows. If no mask is applied to dataword 142, dataword bit 142(0) passes to XOR-gate 164(0) and the inverse of dataword bit 142(0) passes to XOR-gate 166(0). However, since WRITE line 168 and thus one input of XOR-gate 164(0) and one input of XOR-gate 166(0) is set high, each of XOR-gates 164(0) and 166(0) outputs the inverse of the signal on its other input. That is, B(0) is set equal to the inverse of dataword bit 142(0) and $\overline{\text{B}}$(0) is set equal to dataword bit 142(0). These values for B(0) and $\overline{\text{B}}$(0) are then written into CAM cell 102(0).

On the other hand, if decoder 138 applies a mask to the operation, then, at least one of the inputs of each of OR-gates 160(0) and 162(0) is high, forcing the outputs of both OR-gates 160(0) and 162(0) to also be high. Since WRITE line 168 is now high, however, the high outputs of OR-gates 160(0) and 162(0) causes the outputs of both XOR-gates 164(0) and 166(0) to be low. In other words, a DON'T CARE state is written into CAM cell 102(0).

In the MATCH mode (i.e., WRITE line 168 set low), subarray 145(0) works as follows. If no mask is applied to dataword 142 (i.e., mask code 140 is binary 00), then each of the mask lines of decoder 138 is set to an inactive state. Under those conditions, dataword bit 142(0) passes to XOR-gate 164(0) and the inverse of dataword bit 142(0) passes to XOR-gate 166(0). Since WRITE line 168 is low, XOR-gate 164(0) passes dataword bit 142(0) to its output thereby setting B(0) equal to dataword bit 142(0) and, similarly, XOR-gate 166(0) passes the inverse of dataword bit 142(0) to its output thereby setting $\overline{\text{B}}$(0) equal to the inverse of dataword bit 142(0). Depending upon whether or not bits B(0) and $\overline{\text{B}}$(0) match the information in CAM cell 102(0) MATCH line 169 will either be allowed to remain high, indicating a match, or will be forced low, indicating no match.

If a mask is applied to the compare operation by setting mask code 142 to a binary value other than binary 00, then decoder 138 activates the corresponding one of mask lines 141 and at least one of the inputs of OR-gate 160(0) and at least one of the inputs of OR-gate 162(0) goes high, thereby forcing the outputs of both OR-gates 160(0) and 162(0) to also go high. In the MATCH mode, this causes the outputs of both XOR-gates 164(0) and 166(0) to be high. In other words, bitlines 146(0) and 152(0) are energized, which reflects a DON'T CARE state, and CAM cell 102(0) lets MATCH line 169 remain high.

The circuitry for processing each of the higher order bits of dataword 142, namely, bits 142(1) and 142(2), is similar in both structure and operation. In particular, the circuitry for processing dataword bit 142(1) also includes two OR-gates 160(1) and 162(1) and two XOR-gates 164(1) and 166(1). OR-gate 160(1) has three non-inverting inputs and OR-gate 162(1) has two non-inverting inputs and one inverting input. The signals on mask lines 141(1) and 141(2) drive the two non-inverting inputs on each of OR-gates 160(1) and 162(1), while the remaining input on each of OR-gates 160(1) and 162(1) receives dataword bit 142(1). Thus, activating any of mask lines 141(i) corresponding to a bit position (i) that is equal to or higher than the bit position of dataword bit 142(1) masks dataword bit 142(1).

Similarly, the circuitry for processing the highest order bit of dataword 142, namely, bit 142(2), also includes two OR-gates 160(2) and 162(2) and two XOR-gates 164(2) and 166(2). OR-gate 160(2) has two non-inverting inputs and OR-gate 162(2) has one non-inverting input and one inverting input. Mask line 141(3) drives the non-inverting input on each of OR-gates 160(2) and 162(2), while the remaining input on each of OR-gates 160(2) and 162(2) receives dataword bit 142(2). Thus, only by activating mask line 140(2) is dataword bit 142(2) masked.

The following example illustrates the operation of compare circuit 130 in the MATCH mode. Assume that mask code 140 is binary 10, that dataword 142 is binary 101 and that stored CAMword is binary 010. In response to mask code 140, decoder 138 sets mask line 141(2) to an activated state and holds the other mask lines, namely, mask lines 141(0), 141(1) and 141(3), in inactivated states. Consequently, OR-gates 160(0), 160(1), 162(0), and 162(1) each have at least one non-inverting input set high, forcing all of their outputs to also be high. Since circuit 130 is in a MATCH mode, meaning the signal on WRITE line 168 is low, the outputs of XOR-gates 164(0), 164(1), 166(0), and 164(1) are also forced to be high. Thus, the signals that appear on bitlines 146(0) and 146(1) and on bitlines 152(0) and 152(1) represent DON'T CARE states and neither CAM cell 102(0) nor CAM cell 102(1) pulls MATCH line 169 down to low. Since mask line 141(3) is not activated, OR-gate 160(2) passes dataword bit 142(2) on to XOR-gate 164(2) and OR-gate 166(2) passes the inverse of dataword bit 142(2) on to XOR-gate 166(2). Both XOR-gates 164(2) and 166(2), in turn, set the signal on bitline 146(2) and the signal on bitline 152(2) equal to dataword bit 142(2) and the inverse of dataword bit 142(2), respectively. Since the input signals to CAM cell 102(2) correspond to a ZERO state and this does not match the stored state (which was assumed to be ONE), CAM cell 102(2) pulls MATCH line 169 low, indicating no match.

In a WRITE mode, i.e., asserting a high level on WRITE line 168, the signals on bitlines 146(0), 146(1), and 146(2), and the signals on bitlines 152(0), 152(1), and 152(2) are inverted from what was described in the MATCH mode and the data is written into CAM cells 102(0), 102(1), and 102(2). That is, both CAM cells 102(0) and 102(1) receive a ZERO at both of their inputs and thus store a DON'T CARE state, while CAM cell 102(2) receives a ZERO over bitline 146(2) and a ONE over bitline 152(2) and thus stores a ONE state.

What is claimed is:

1. A masked compare circuit for comparing a first N-bit dataword to a second N-bit dataword, N being a positive integer, the circuit comprising:
    a decoder for receiving an M-bit mask code and generating an output signal identifying a bit position, K, derived from the M-bit mask code, M and K being positive integers; and
    a comparator module responsive to the decoder output signal for comparing the $N-K+1$ most significant bits of the first dataword to corresponding most significant bits of the second data word, the comparator module generating an output signal having a first value when all of the compared bits are the same and having a second value when any of the compared bits is different,
    wherein the comparator module includes:
    an array of N comparators, each comparator of the comparator array for comparing a different bit of the first dataword to a corresponding bit of the second dataword, the comparator array generating an N-bit match signal which identifies all bit positions of the first and second datawords that match;
    an array of gates responsive to the decoder output signal for generating a masked match signal by setting the first K least significant bits of the match signal to indicate a match; and
    an N-input AND gate for receiving the masked match signal and producing the comparator module output signal therefrom.

2. The masked compare circuit of claim 1 wherein the decoder is a M-line to $2^M$-line decoder, the M input lines for receiving the M-bit mask code and the $2^M$ output lines for outputting the decoder output signal and wherein the decoder activates an output line corresponding to the K bit position identified by the mask code.

3. A masked compare circuit for comparing a first N-bit dataword to a second N-bit dataword, N being a positive integer, the circuit comprising:
    a decoder for receiving an M-bit mask code and generating an output signal identifying a bit position, K, derived from the M-bit mask code, M and K being positive integers; and
    a comparator module responsive to the decoder output signal for comparing the $N-K+1$ most significant bits of the first dataword to corresponding bits of the second data word, the comparator module generating an output signal having a first value when all of the compared bits are the same and having a second value when any of the compared bits is different, wherein the comparator module comprises:
    an array of gates responsive to the decoder output signal for converting the first dataword into a 3-state representation having N elements, ($c_{N-1}$, $c_{N-2}$, ..., $c_0$), where each $c_i$ for $K \geq i \geq (N-1)$ is derived from a corresponding bit of the first dataword and each $c_i$ for $0 \geq i \geq (K-1)$ is equal to a DON'T CARE state, and
    a logic array comprising N 3-value logic cells, each 3-value logic cell for storing a corresponding bit of the second dataword and for receiving a corresponding element of the 3-state representation, the logic array generating the comparator module output signal.

4. A method for comparing a first N-bit dataword to a second N-bit dataword, N being a positive integer, the method comprising:
    receiving an M-bit mask code, M being a positive integer;
    generating an output signal identifying a bit position, K, derived from the M-bit mask code, K being a positive integer;

comparing the N−K+1 most significant bits of the first dataword to corresponding most significant bits of the second dataword; and generating an output signal having a first value when all of the compared bits are the same and having a second value when any of the compared bits are different, wherein the step of comparing includes identifying all bit positions of the first and second datawords that match by individually comparing each bit of the first dataword with its corresponding bit of the second dataword in a separate comparator of a comparator array and generating a masked match signal in response to the identified bit position K to indicate that the K least significant bits are the same.

* * * * *